United States Patent
Schwarzer et al.

(10) Patent No.: US 7,830,285 B2
(45) Date of Patent: Nov. 9, 2010

(54) CIRCUIT WITH CALIBRATION CIRCUIT PORTION

(75) Inventors: Christoph Schwarzer, Munich (DE); Holger Wenske, Freising (DE); Thomas Eichler, Unterhaching (DE); Mark Hesener, Munich (DE); Armin Hanneberg, Haar (DE); David Herbison, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 36 days.

(21) Appl. No.: 12/170,909

(22) Filed: Jul. 10, 2008

(65) Prior Publication Data
US 2010/0007535 A1     Jan. 14, 2010

(51) Int. Cl.
*H03M 1/10* (2006.01)
(52) U.S. Cl. ................................ 341/120; 341/155
(58) Field of Classification Search .......... 341/120–155
See application file for complete search history.

(56) References Cited

U.S. PATENT DOCUMENTS

| | | | |
|---|---|---|---|
| 5,629,635 A | 5/1997 | Reno | |
| 5,933,013 A * | 8/1999 | Kimura | 324/601 |
| 6,515,506 B1 | 2/2003 | Lo | |
| 7,034,567 B2 * | 4/2006 | Jang | 326/30 |
| 7,304,495 B2 * | 12/2007 | Nygren | 326/30 |
| 7,427,866 B2 * | 9/2008 | Ellersick et al. | 324/601 |
| 7,495,487 B2 * | 2/2009 | Ma et al. | 327/158 |
| 7,564,258 B2 * | 7/2009 | Nguyen et al. | 326/30 |
| 7,592,824 B2 * | 9/2009 | Ware et al. | 324/763 |
| 7,595,656 B2 * | 9/2009 | Hayami et al. | 326/30 |
| 2002/0198718 A1 | 12/2002 | Lam | |
| 2004/0124902 A1 | 7/2004 | Choe | |
| 2005/0104624 A1 | 5/2005 | Zumkehr et al. | |
| 2006/0290387 A1 | 12/2006 | Gossmann et al. | |
| 2007/0040716 A1 | 2/2007 | Lin et al. | |
| 2008/0079441 A1 | 4/2008 | Yuan | |

FOREIGN PATENT DOCUMENTS

JP     2006115489 A     4/2006

* cited by examiner

*Primary Examiner*—Lam T Mai
(74) *Attorney, Agent, or Firm*—Coats & Bennett, P.L.L.C.

(57) ABSTRACT

In an embodiment, a circuit is disclosed comprising a circuit portion coupled to a terminal and a calibration circuit portion coupled to said terminal.

25 Claims, 4 Drawing Sheets

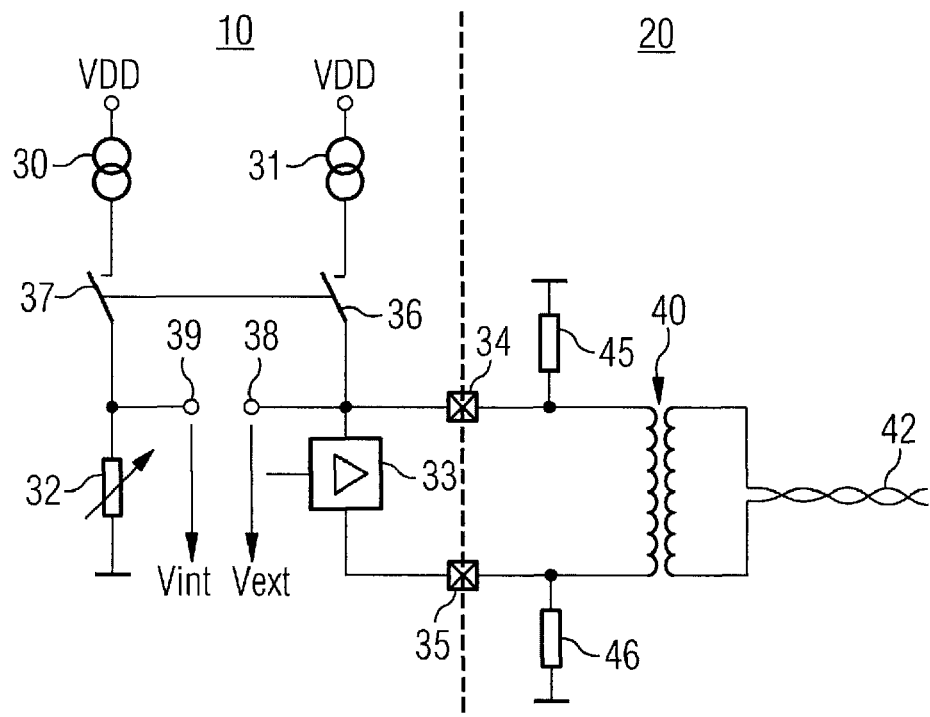
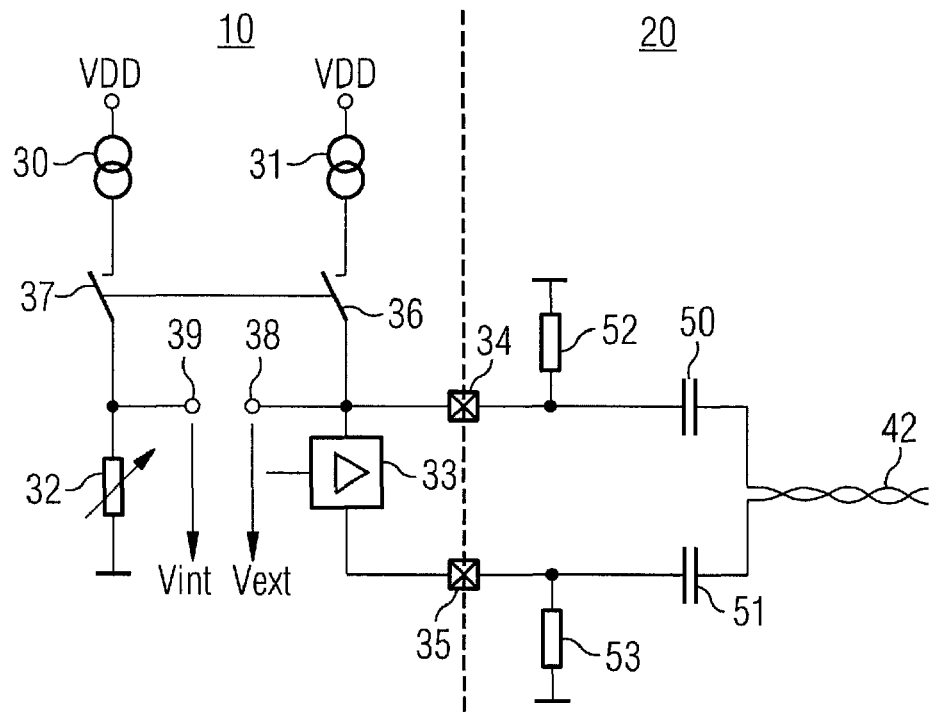

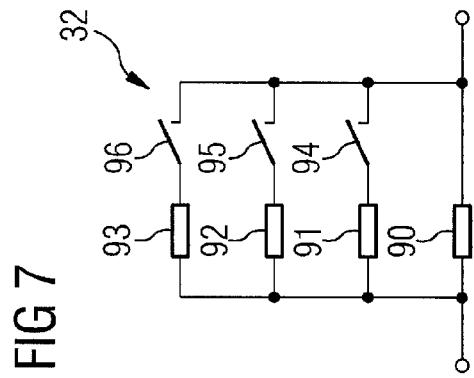
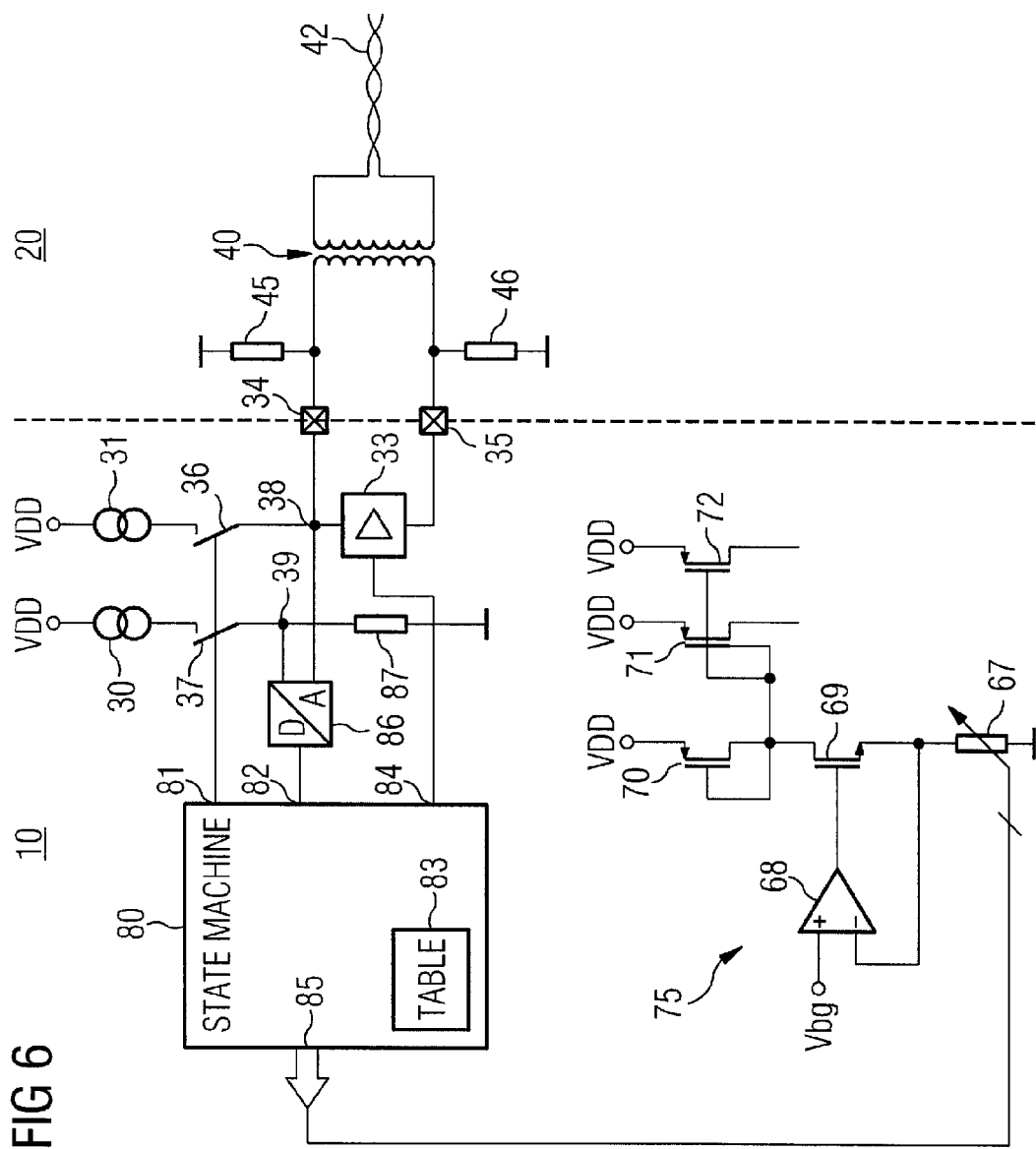

CIRCUIT WITH CALIBRATION CIRCUIT PORTION

FIELD OF THE INVENTION

Some embodiments of the present invention relate to a circuit with a calibration circuit portion. Other embodiments relate to a corresponding method.

BACKGROUND OF THE INVENTION

Electronic circuits are in many cases manufactured as chips where one or more semiconductor integrated circuits are packaged in a chip housing, wherein such a chip housing usually has a plurality of pins extending therefrom. The pins serve as terminals for the integrated circuit within the package, for example as input terminals, output terminals or terminals for voltage supply. In general, costs for manufacturing such a chip comprising a packaged semiconductor integrated circuit increases with increasing number of pins.

On the other hand, semiconductor integrated circuits sometimes comprise circuit elements having a certain tolerance. For example, a semiconductor integrated circuit may comprise one or more resistors made of polysilicon. To calibrate such internal circuit elements, i.e. to adjust them to a desired nominal value, external circuit elements, i.e. circuit elements which are connected to one or more of the pins of the semiconductor chip, which external circuit elements are manufactured with lower tolerance than the internal circuit elements, may be used. Obviously, for such a calibration corresponding pins are necessary for coupling the external circuit element to the semiconductor chip.

SUMMARY

According to an embodiment, a circuit is provided, comprising at least one terminal, and a circuit portion coupled to said terminal. The circuit further comprises a calibration circuit coupled to said terminal, and an internal circuit element. Said circuit portion is configured to communicate via said terminal in a first operating mode of said apparatus. Furthermore, said calibration circuit is configured to calibrate said internal circuit element in a second operating mode of said circuit using at least one external circuit element coupled to said terminal.

In other embodiments, different circuits, methods or chips may be provided.

BRIEF DESCRIPTION OF THE DRAWINGS

FIG. 3 is a circuit diagram of a circuit according to a further embodiment of the present invention.

FIG. 4 is a circuit diagram of a circuit of yet another embodiment of the present invention.

FIG. 6 is a circuit diagram of a circuit according to yet another embodiment of the present invention.

FIG. 7 shows an example for a tunable resistor according to an embodiment of the present invention.

DETAILED DESCRIPTION OF THE INVENTION

Figure 1:
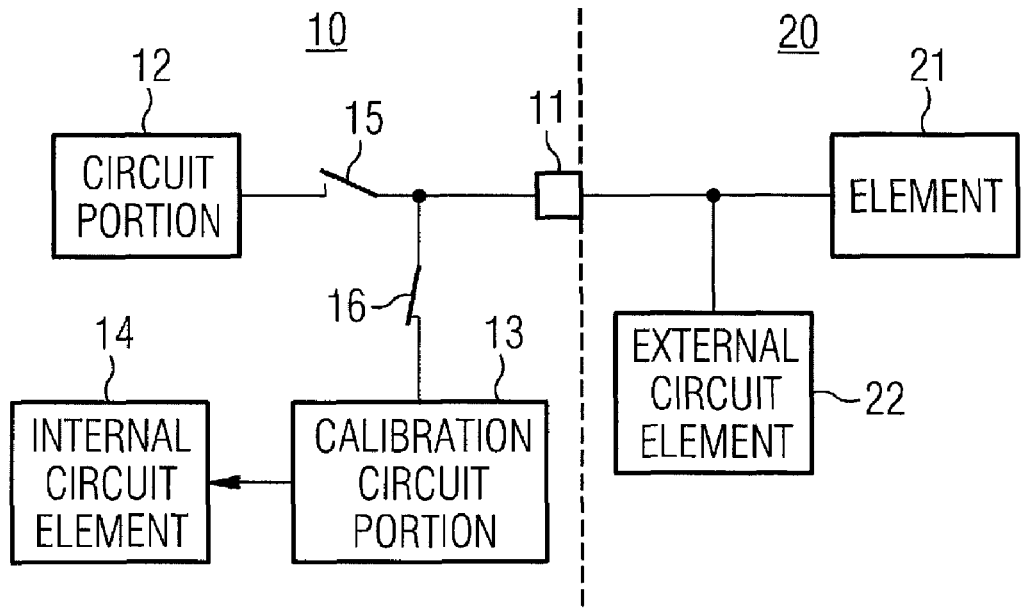
FIG. 1 is a schematic block diagram of a circuit according to an embodiment of the present invention.

In the following, embodiments of the present invention will be described in detail. It is to be understood that the following description is given only for the purpose of illustration and is not to be taken in a limiting sense. The scope of the invention is not intended to be limited by the embodiments described hereinafter, but is intended to be limited only by the appended claims and equivalents thereof.

It is also to be understood that in the following description of embodiments any direct connection or coupling, i.e. any connection or coupling without intervening elements, between functional blocks, devices, components, circuit elements or other physical or functional units shown in the drawings or described herein could also be implemented by an indirect connection or coupling, i.e. a connection or coupling comprising one or more additional intervening elements. Furthermore, it should be appreciated that representing different blocks or units performing different functions in the drawings is not to be construed as indicating that these blocks or units necessarily have to be implemented in physically separate circuits. In contrast, unless noted to the contrary, functional blocks or units shown in the drawings may be implemented as separate circuits in some embodiments, but may also be fully or partially implemented in a common circuit in other embodiments.

It is further to be noted that describing an embodiment which comprises a plurality of elements is not to be construed as indicating that all these elements are necessary for practicing the present invention. Instead, in other embodiments, fewer elements and/or alternative elements may be present.

It is to be understood that features of the various embodiments described herein may be combined with each other unless specifically noted otherwise.

Turning now to the figures, in FIG. 1 a circuit 10 according to an embodiment of the present invention is shown. Further, a circuitry 20 coupled to circuit 10 is shown. Another embodiment, in addition to circuit 10, further may comprise one or more elements of circuitry 20.

Circuit 10 of the embodiment of FIG. 1 comprises a terminal 11, a circuit portion 12 coupled with terminal 11 via a switch 15, a calibration circuit portion 13 coupled with terminal 11 via a switch 16, and an internal circuit element 14. In an embodiment, in a first mode of operation, switch 15 is closed and switch 16 is opened. In this case, circuit portion 12 may communicate via terminal 11 with elements of circuitry 20, for example with an element 21. "Communicating" may comprise outputting signals via terminal 11, receiving signals via terminal 11 or both. For example, in an embodiment circuit portion 12 may be a driver circuit to output signals generated by further circuit portions (not shown) of circuit 10 via terminal 11. In another embodiment, circuit portion 12 may be a receiver circuit portion receiving signals via terminal 11.

In a second mode of operation, which is represented in FIG. 1, switch 15 is opened and switch 16 is closed. In this second mode of operation, calibration circuit portion 13 may calibrate internal circuit element 14 using an external circuit element 22. For example, internal circuit element 14 may be a resistor, an array of resistors, a capacitor or an array of capacitors with a certain manufacturing tolerance. External circuit element 22 may also be a resistor or a capacitor which in an embodiment has a lower manufacturing tolerance than internal circuit element 14. In an embodiment, calibration circuit portion 13 performs measurements, for example resistance measurements, measurements of a voltage drop over internal circuit element 14 and/or external circuit element 22, current measurements of current flowing through internal circuit element 14 and/or external circuit element 22 or capacitance measurements. Through comparing the measurement data obtained from measuring external circuit element 22 and measurement data obtained from measuring internal circuit element 14, internal circuit element 14 may be calibrated. For example, in a case where internal circuit element 14 is an array of switchable resistors or an array of switchable capacitors or another type of tunable resistor or capacitor, calibration circuit portion 13 may adjust the value of internal circuit element 14, for example by opening and closing switches thereof, to adjust the resistance or capacitance value of internal circuit element 14 to a desired nominal value.

It should be noted that while in the embodiment of FIG. 1 one terminal 11 is represented, circuit portion 12 and calibration circuit portion 13 each may be connected to more than one terminal, for example two terminals. Furthermore, while in the embodiment of FIG. 1 switches 15 and 16 are shown, in other embodiment one or both of these switches may be omitted. In other embodiments, additionally or alternatively to switches 15 and 16, circuit portion 12 and/or calibration circuit portion 13 may be switchable between an active state and an inactive state.

In the embodiment described above, by using terminal 11 both as a terminal for circuit portion 12 and as a terminal for calibration circuit portion 13, on the one hand a calibration of internal circuit element 14 is enabled and on the other hand a reduced number of terminals, for example a reduced number of pins of a chip, is required.

Circuit 10 may be part of an integrated circuit, and terminal 11 may be a pin of such an integrated circuit. Element 21 may be any element intended to communicate with circuit portion 12, for example an element for receiving signals output by circuit portion 12 via terminal 11.

Next, with reference to FIGS. 2-6, further embodiments of circuit 10 and external circuitry 20 will be discussed. Throughout the figures, like or similar elements are denoted with the same reference numerals, which is not to be construed as indicating that these elements need to be exactly identical.

Figure 2:
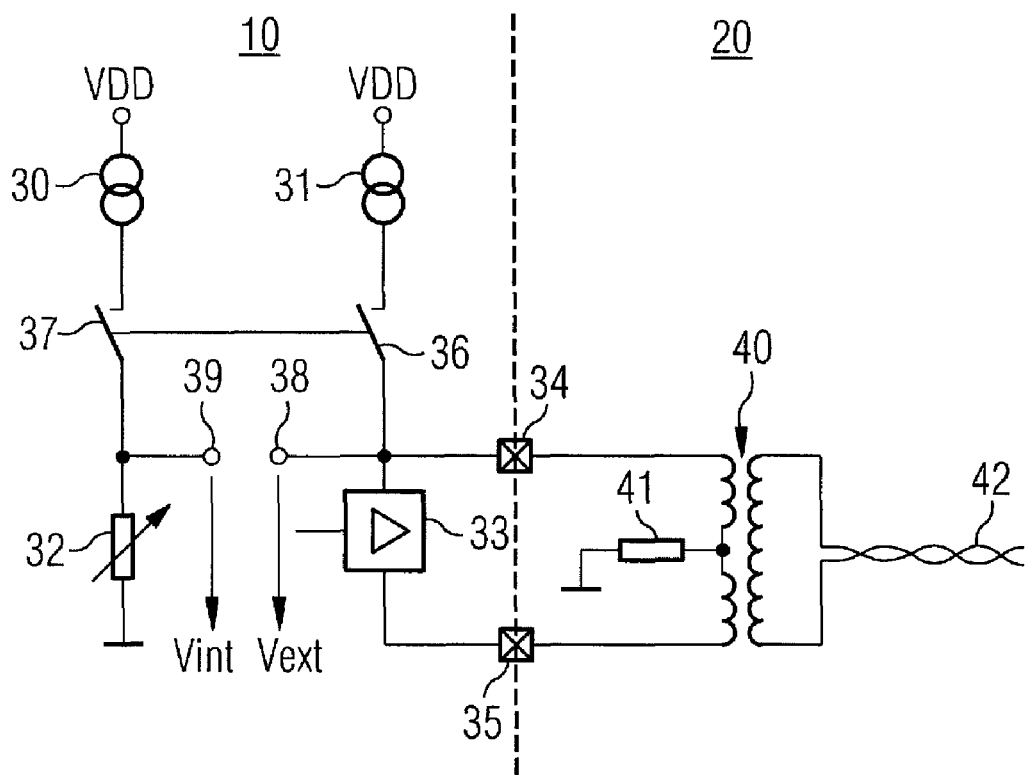
FIG. 2 is a circuit diagram of a circuit according to another embodiment of the present invention.

In FIG. 2, a circuit 10 according to a further embodiment of the present invention comprises a driver circuit 33 coupled to terminals 34, 35 to output differential output signals via these terminals. For example, in an embodiment driver circuit 33 is configured to output communication signals like DSL (Digital Subscriber Line), VDSL (Very High Speed DSL) or Ethernet signals generated by further parts of circuit 10 (not shown). Driver circuit 33 is a possible example for circuit portion 12 of FIG. 1.

Circuit 10 may be part of an integrated circuit packaged in a semiconductor chip, and terminals 34, 35 may be pins of this semiconductor chip.

Circuit 10 of the embodiment of FIG. 2 further comprises a tunable resistor 32. Tunable resistor 32 may for example comprise an array of parallel switchable polysilicon transistors, wherein through the switches a resistor value may be varied. An example for such a resistor will be described later with reference to FIG. 7. Tunable resistor 32 may be calibrated to have a desired nominal value, such that through the tuning or calibration for example manufacturing tolerances may be balanced or mitigated within a predetermined accuracy.

To perform such a calibration, circuit 10 of the embodiment of FIG. 2 comprises a calibration circuit portion. Calibration circuit portion in the embodiment of FIG. 2 comprises current sources 30, 31, switches 36, 37 and nodes 38, 39. The calibration circuit portion of circuit 10 of the embodiment of FIG. 2 may comprise further elements which are not shown in FIG. 2, but examples for such further elements will be discussed later with reference to FIGS. 5 and 6.

In the embodiment of FIG. 2, a circuitry 20 comprises a transformer 40 serving as a coupling circuit to couple a communication line 42, for example a twisted pair of copper lines, to terminals 34, 35.

In a first mode of operation of circuit 10, driver circuit 33 is configured to output signals, for example communication signals, via terminals 34 and 35, which communication signals are then coupled into line 42 via transformer 40. In the first mode of operation, switches 36 and 37 are opened so that current sources 30, 31 do not disturb the operation of driver circuit portion 33.

In a second mode of operation, the calibration circuit portion of circuit 10 is operable to calibrate resistor 32, i.e. to tune resistor 32 to a desired nominal value. The tuning is effected using an external circuit element of circuitry 20, in the embodiment of FIG. 2 a reference resistor 41 which is coupled between a middle contact of transformer 40 and ground. In the embodiment of FIG. 2, resistor 41 has a resistance value corresponding to the nominal, i.e. desired, value of tunable resistor 32.

In an embodiment, in the second mode of operation, driver 33 is deactivated. For example driver circuit 33 may be put in a high-ohmic state, for example a tristate. For example, in an embodiment driver circuit portion 33 comprises MOS transistors, and in tristate some or all of these MOS transistors are put to a high-ohmic state, i.e. a state where the MOS transistors are essentially non-conducting between their respective source and drain terminals. Furthermore, in this second mode of operation, in the embodiment of FIG. 2 switches 36 and 37 are closed.

Current sources 30, 31 are designed to output nominally the same currents, i.e. to output the same current within a predetermined tolerance. In an embodiment, the deviation between the current generated by current sources 30, 31 is smaller than the desired tolerance of the resistance value of resistor 32 compared with its nominal value.

When switches 36, 37 are closed in the second mode of operation, a current flows via current source 31, switch 36, terminal 34, a portion of transformer 40 which for DC currents in the embodiment of FIG. 2 has a negligible ohmic resistance, and external resistor 41 to ground. In this configuration, a voltage drop over external resistor 41 may be measured at node 38 and is designated with Vext in FIG. 2. On the other hand, a current generated by current source 30 flows via switch 37 and tunable resistor 32 to ground. A voltage drop over tunable resistor 32 may be measured at node 39 and is designated Vint in FIG. 2. In an embodiment, Vint and Vext are compared, and the value of resistor 32 is tuned such that Vint=Vext. In this case, within the tolerance determined by the tolerance of resistor 41 and the deviation of the current generated by current sources 30 and 31, the value of resistor 32 is tuned to the value of external resistor 41.

In the embodiment of FIG. 2, external resistor 41 is connected to a middle contact of transformer 40, i.e. is connected in a symmetric manner with respect to terminals 34, 35. In such an embodiment, the operation of driver circuit portion 33 in the first mode of operation is essentially not disturbed by the presence of external resistor 41.

In other embodiments, an external circuit element like an external resistor may be provided in external circuitry 20 at a position other than a middle contact of a transformer. Examples for this will now be described with reference to FIGS. 3 and 4. In the embodiments of FIGS. 3 and 4, a circuit 10 corresponds to the one already described with reference to FIG. 2, and corresponding elements bear the same reference numerals. Therefore, circuit 10 of the embodiments of FIGS. 3 and 4 will not be described again. Also, the operation of circuit 10 with the first mode of operation for outputting signals generated by a driver circuit portion 33 and a second mode of operation for calibrating a tunable resistor 32 generally corresponds to the operation already described with reference to FIG. 2.

In the embodiment of FIG. 3, circuitry 20 comprises a transformer 40 and a line 42 coupled to transformer 40 such that signals generated by driver 33 are output via terminals 34 and 35 are coupled into line 42 via transformer 40, as has already been described with reference to FIG. 2. Furthermore, in the embodiment of FIG. 3, two external reference resistors 45, 46 are provided, wherein external reference resistor 45 is coupled between terminal 34 and ground and external reference resistor 46 is coupled between terminal 35 and ground as shown in FIG. 3. In the embodiment of FIG. 3, resistors 45, 46 are nominally equal, i.e. essentially have the same resistance value. Therefore, in the embodiment of FIG. 2 resistors 45, 46 represent a symmetric load with respect to transformer 40 and terminals 34, 35 which essentially does not disturb signal transmission of signals output by driver circuit portion 33 to be transmitted via line 42 in the first mode of operation.

In an embodiment, the resistance values of resistors 45, 46 are twice the desired nominal resistance value of tunable resistor 32, i.e. twice the value to which tunable resistor 32 is to be calibrated. When in the second mode of operation of circuit 10 switch 36 is closed as already described with reference to FIG. 2, since the resistance of transformer 40 is essentially negligible resistors 45 and 46 form a parallel connection to ground the overall resistance of which is then half the resistance value of a single one of resistors 45, 46 or, in other words, the desired nominal resistance value of resistor 32. Therefore, in the embodiment of FIG. 3 the tuning of resistor 32 may be performed in the same manner as already explained with reference to FIG. 2, i.e. by tuning resistor 32 such that Vint=Vext.

In FIG. 4, a further configuration of circuitry 20 according to an embodiment is shown. In FIG. 4, line 42 is coupled with terminals 34, 35 via capacitances 50, 51, or, in other words, the inductive coupling by transformer 40 of the embodiments of FIGS. 2 and 3 has been replaced by a capacitive coupling via capacitors 50, 51. Capacitors 50, 51 are essentially non-conducting for DC currents, whereas they are conducting for AC currents or modulated signals output by driver circuit portion 33. Therefore, also in the embodiment of FIG. 4 such modulated signals, for example communication signals, output by driver circuit 33 may be coupled into line 42.

Furthermore, for calibration purposes an external reference resistor 52 is provided which is coupled between terminal 34 and ground as shown in FIG. 4. In an embodiment, external resistor 52 has the same resistor value as the nominal value, i.e. the desired value of tunable resistor 32. In an embodiment, resistor 52 is manufactured with a low manufacturing tolerance, for example a manufacturing tolerance essentially corresponding to a desired accuracy of the tuning of tunable resistor 32.

In the embodiment of FIG. 4, a further external resistor 53 is provided which has the same nominal value as resistor 52 and which is coupled between terminal 35 and ground as shown in FIG. 4. Resistors 52, 53 represent a symmetric load to terminal 34, 35 which in the embodiment of FIG. 4 essentially do not disturb the transmission of signals from driver circuit portion 33 to line 42 in the first mode of operation.

In the second mode of operation of circuit 10 in which tunable resistor 32 is to be calibrated, i.e. tuned to a desired nominal value, current output by current source 31 flows via switch 36, terminal 34 and resistor 52 to ground and therefore, Vext corresponds to the voltage drop over resistor 52. Since capacitor 50 is essentially non-conducting for DC currents, no current flows via resistor 53 or line 42 in this case.

In the embodiments of FIGS. 2-4 tuning of resistor 32 is performed by comparing voltages Vint and Vext at nodes 39, 38 respectively. Possible implementation of such a comparison as well as a possible application for a tunable resistor will now be discussed with reference to FIG. 5.

Figure 5:
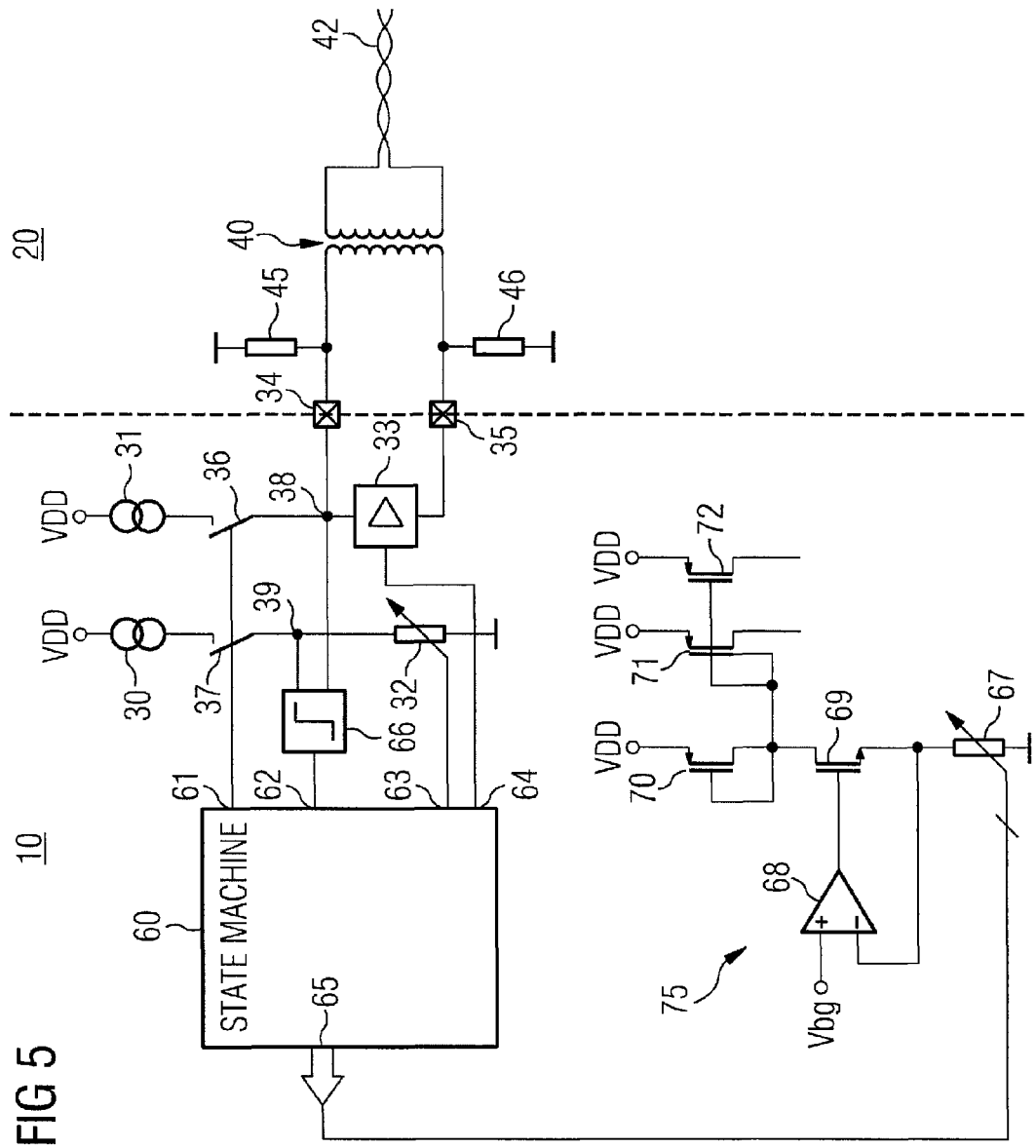
FIG. 5 is a circuit diagram of another embodiment of the present invention.

In the embodiment of FIG. 5, external circuitry 20 corresponds to the one already described with reference to FIG. 3 and will therefore not be described again. It should be noted that instead of the external circuitry of the embodiment of FIG. 3, also the external circuitry of the embodiment of FIG. 2 or of the embodiment of FIG. 4 may be used in the embodiment of FIG. 5. Moreover, in the embodiment of FIG. 5 current sources 30, 31, tunable resistor 32, driver circuit portion 33, terminals 34, 35 and switches 36, 37 correspond to the elements already described with reference to FIG. 2 and will therefore not be described again in detail.

In the embodiment of FIG. 5, a state machine 60 is provided which controls the calibration and the switching between the first mode of operation and the second mode of operation of circuit 10. State machine 60 comprises a switching output 61 for controlling switches 36, 37 to be opened in the first mode of operation and closed in the second mode of operation. Moreover, state machine 60 comprises a driver control output 64 to deactivate driver circuit portion 33 in the second mode of operation for example by putting driver circuit portion 33 into a tristate mode and by activating driver circuit portion 33 in the first mode of operation.

Circuit 10 of the embodiment of FIG. 5 furthermore comprises a comparator 66 coupled to nodes 38 and 39 to compare the voltages at external resistors 45, 46 Vext and the voltage at internal tunable resistor 32 Vint (see FIG. 2) and to feed a corresponding comparison signal to an input 62 of state machine 60. Comparator 66 in an embodiment has a digital output indicating which of voltages Vint, Vext is greater. In another embodiment, comparator 66 may have an output with three states including a state indicating that within a desired level of accuracy the voltages are equal. However, the output of comparator 66 in other embodiments is not restricted to these possibilities.

State machine 60 furthermore comprises an output 63 for tuning tunable resistor 32. Output 63 may be a multi-bit digital output, for example a 3-bit output corresponding to eight different tuning values of tunable resistor 32. In an embodiment, if the signal output by comparator 66 indicates that Vint>Vext, i.e. that the resistance value of tunable resistor 32 is greater than half the resistance value of external resistor 45, the signal output by output 63 is changed to lower the resistance of tunable resistor 32, and if the output signal of comparator 66 indicates that Vext>Vint, the signal output at output 63 is changed to increase the resistance value of tunable resistor 32. Tunable resistor 32 in this case may comprise an array of parallel switchable resistors.

An example for such a tunable resistor 32 is shown in FIG. 7. In the embodiment of FIG. 7, tunable resistor 32 comprises a base resistor 90 and three parallel switchable resistors 91, 92 and 93 switchable with switches 94, 95 and 96, respectively. In an embodiment, switches 94, 95 and 96 may be CMOS switches. In an embodiment, resistor 90, 91, 92 and 93 may be polysilicon resistors.

In an embodiment, base resistor 90 has a nominal resistance value slightly above, for example 10% above, the nominal overall resistance value of resistor 32. By closing one or more of switches 94, 95 and 96, the overall resistance value of resistor 32 is lowered such that by selectively closing switches 94, 95 and 96 the resistance value may be tuned to the desired value.

In an embodiment, for example a 3 bit signal may be used for tuning resistor 32 of FIG. 7, each bit opening or closing one of switches 94, 95 and 96.

In an embodiment, the resistance values of resistors 91, 92 and 93 are different to be able to lower the overall resistance by different amounts. For example, resistance ratios of resistors 91, 92 and 93 may be approximately 1:2:4, although the values are not limited in this respect.

It should be noted that the arrangement of resistors in FIG. 7 serves merely as an example, and other arrangements are equally possible. For example, more than three parallel switchable resistors may be provided, or also resistors coupled in series may be provided, e.g. with switchable bypass path.

Returning now to FIG. 5, the tuning process described above is continued until comparator 66 indicates that the voltages at nodes 38 and 39 are equal within a given tolerance or, in another embodiment, if in case resistance of tunable resistor 32 is below the resistance of half the resistance value of external resistor 45 increasing the resistance value of tunable resistor 32 by the smallest possible amount would reverse this situation, i.e. make the resistance value of tunable resistor 32 greater than half the resistance value of external resistor 45, or vice versa, i.e. if comparator 66 indicates that the resistance value of tunable resistor 32 is greater than half the resistance value of external resistor 45 or 46 and if lowering the resistance value of tunable resistor 32 by the smallest possible amount would reverse this situation. In this case, the optimum tuning is obtained, i.e. in this case the resistance value of internal tunable resistor 32 matches half the resistance value of resistors 45, 46 as close as possible within the tuning accuracy.

Circuit 10 of the embodiment of FIG. 5 further comprises a current source circuit portion generally designated 75 in FIG. 5 which comprises a tunable resistor 67, an operational amplifier 68 and MOS transistors 69-72. MOS transistors 71, 72 are coupled with a supply voltage, for example positive supply voltage VDD, and generate a current flowing between their source and drain terminals which is determined by a band gap voltage Vbg fed to a positive input of operational amplifier 68 and by the resistance value of tunable resistor 67. In particular, a current flowing through MOS transistors 71, 72 which act as current sources in the embodiment of FIG. 5 is equal to Vbg/Rtune, wherein Rtune is the resistance value of tunable resistor 67. Vbg in the embodiment of FIG. 5 is an essentially constant voltage generated corresponding to the band gap of a semiconductor, for example approximately 1.2 V when silicon is used as the semiconductor. In the embodiment of FIG. 5, operational amplifier 68 regulates the gate voltage of MOS transistor 69 such that a current corresponding to the value above flows through MOS transistor 70, and this current is mirrored to MOS transistors 71, 72. It should be noted that while two MOS transistors 71, 72 acting as current sources in circuit portion 75 are shown, any desired number of such current sources depending on a number of current sources needed for circuit 10 including other portions of circuit 10 not shown in FIG. 6 may be used.

In an embodiment, tunable resistor 67 is designed equal to tunable resistor 32, for example has the same nominal value and may for example have the same or similar layout arrangement, e.g. equal or similar resistor width and/or length, and/or resistors 32 and 67 may be arranged adjacent to each other in a circuit layout such that process or other variations of the resistance value of resistor 32 essentially also apply to resistor 67.

In the embodiment of FIG. 5, when tunable resistor 32 has been tuned, over an output 65 of state machine 60 the same tuning signal as on output 63 is applied to tunable resistor 67 to calibrate the same. Since, as described above, in the embodiment of FIG. 5 resistors 32 and 67 are designed equal, in this way tunable resistor 67 is tuned to its desired nominal value and consequently, the current output via MOS transistors 71, 72 is tuned to a desired nominal value.

In the embodiment of FIG. 5, transistors 69-72 are MOS transistors. In other embodiments, other transistors or other configurations of transistors may be used.

It should be noted that in an embodiment, current sources 30, 31 may be implemented by MOS transistors 71, 72. In this respect, even before tuning resistor 67, transistors 71, 72 output nominally the same current, although the absolute value of this current is not yet calibrated. In another embodiment, current sources 30, 31 may be implemented separately from current source circuit portion 75 and/or may be current sources external to circuit 10.

In the embodiment of FIG. 5, first tunable resistor 32 is calibrated, i.e. tuned to a desired nominal value, and then the results are used to calibrate tunable resistor 67. In another embodiment, resistors 32 and 67 may be the same physical resistor, such that directly a tunable resistor used for a certain purpose in circuit 10, in this case used for current generation in a current generation circuit portion 75, is tuned. In such an embodiment, output 65 of state machine 60 may be omitted, since the respective resistor is directly tuned. In still another embodiment, which will be described next with reference to FIG. 6, instead of tunable resistor 32 a reference resistor having a fixed value is used.

In the embodiment of FIG. 6, elements corresponding to the elements already described with reference to FIG. 5 bear the same reference numeral and will not be described again in detail. In particular, external circuitry 20 and current generation circuit portion 75 corresponds to the corresponding portions of FIG. 5. Moreover, also in the embodiment of FIG. 6 current sources 30, 31, switches 36, 37 and a driver circuit portion 33 corresponding to the ones of FIG. 5 are provided. It should be noted that all the modifications discussed with reference to FIG. 5 with respect to the elements present in both embodiments may also be implemented in the embodiment of FIG. 6.

In the embodiment of FIG. 6, an internal reference resistor 87 which has a predetermined nominal value corresponding to a desired nominal value of resistor 67 is provided instead of tunable resistor 32 of the embodiment of FIG. 5. In an embodiment, internal reference resistor 87 may be designed such that process variations affecting the resistance value of internal reference resistor 87 affect the resistance value of tunable resistor 67 in essentially the same manner or extent. For example, internal reference resistor 87 may have a resistor length and/or a similar resistor width similar to a resistor length and/or resistor width used for tunable resistor 67.

Moreover, instead of state machine 60 of the embodiment of FIG. 5, a state machine 80 is provided, and instead of comparator 66 of the embodiment of FIG. 5, an analog to digital converter 86 is provided. State machine 80 of the embodiment of FIG. 6 has an output 81 to control switches 36, 37 and an output 84 to activate and deactivate driver circuit 33, corresponding to outputs 61 and 64 of state machine 60 of the embodiment of FIG. 5. In the second mode of operation when switches 36, 37 are closed and driver circuit portion 33 is deactivated, analog to digital converter 86 converts the voltage difference between nodes 38 and 39, i.e. the difference between Vext and Vint, to a digital value and feeds this digital value to an input 82 of state machine 80. In this case, Vint, i.e. the voltage at node 39, corresponds to the voltage drop over internal reference resistor 87. In the embodiment of FIG. 6, as already described with respect to previous embodiments, a resistance value of resistors 45 and 46 each is twice the nominal value of internal reference resistor 87. Therefore, the digital value output by analog to digital converter 86 of the embodiment of FIG. 6 represents the deviation of the resistance value of internal reference resistor 87 from its nominal value.

State machine 80 using a stored table 83 then translates the digital value output by analog to digital converter 86 to a control signal, for example a 3 bit tune control signal, to tune tunable resistor 67 to its desired nominal value. For example, if the output signal of analog to digital converter 86 indicates a deviation of the resistance value of internal reference resistor 87 from its nominal value by a certain deviation value, it is assumed that also the value of tunable resistor 67 deviates from its nominal value by the same relative deviation value, and a tune control signal is chosen to compensate for this deviation.

It is to be noted that the embodiments described above with reference to FIGS. 1-7 serve merely as examples and are not construed to be limiting the scope of the present invention, as numerous modifications and alterations are possible without departing from the scope of the present invention. For example, while in the embodiments of FIGS. 2-7 external resistors in circuitry 20 have been used as reference for tuning tunable resistors in circuit 10, in other embodiments other type of circuit elements may be tuned. For example, in an embodiment in a circuitry 20 an external reference capacitor may be provided. Such an external reference capacitor may for example be coupled to a middle contact of a transformer, similar to the coupling of resistor 41 of the embodiment of FIG. 2. This external capacitor may be then used to tune an internal tunable capacitor, for example by using a current step occurring when DC reference sources 30, 31 of the embodiments of FIGS. 2-6 are activated.

Moreover, while in FIGS. 5 and 6 a tunable resistor 67 of a current generation circuit portion 75 has been tuned, in other embodiments other resistors of circuit 10 may be additionally or alternatively tuned to a desired value. For example, in other embodiments, resistors, capacitors or other circuit elements of RC filters, oscillators (wherein the circuit element determines a frequency of the oscillator), a feedback resistor determining an amplification of an amplifier, resistors determining a voltage or any other circuit element where a tuning with high accuracy is desired may be tuned.

Moreover, while in FIGS. 5 and 6 state machines 60, 80 are used for performing the calibration and the switching between modes of operation, in other embodiments other circuits, for example multi-purpose processors programmed accordingly, may be used.

Additionally, while in some of the embodiments described above, an external resistor having the same nominal value as an internal tunable resistor or a combination of external resistors the overall resistance value of which corresponds to the nominal value have been used, in another embodiment one or more external resistors may be used the resistance value of which has a predetermined relationship with the nominal resistance value of an internal tunable resistor or an internal reference resistor. For example, in an embodiment based on the embodiment of FIG. 2, resistor 41 may have a nominal value which is twice the nominal value of tunable resistor 32. In this example, instead of Vint=Vext, as a tuning condition 2·Vint=Vext could be used.

Furthermore, while in FIGS. 2-6 a driver circuit portion has been used as an example for a circuit portion which shares a terminal with a calibration circuit, in other embodiments a circuit portion other than a driver circuit portion may use terminals in a first mode of operation while the one or more terminals are used for calibration in a second mode of operation.

Therefore, the scope of the present invention is not to be intended to be limited by the embodiments described above, but only by the appended claims and equivalents thereof.

What is claimed is:

1. A circuit, comprising:
   at least one terminal,
   a circuit portion coupled to said terminal,
   a calibration circuit portion coupled to said terminal, and
   an internal circuit element,
   wherein said circuit portion is configured to communicate via said terminal in a first operating mode of said circuit, and
   wherein said calibration circuit portion is configured to calibrate said internal circuit element in a second operating mode of said circuit using at least one external circuit element coupled to said terminal.

2. The circuit of claim 1, wherein said calibration circuit portion is configured to calibrate said internal circuit element by comparing a voltage drop over said external circuit element with a voltage drop over said internal circuit element.

3. The circuit of claim 1, further comprising:
   an internal reference element,
   wherein said calibration circuit portion is configured to compare said internal reference element with said external circuit element and to calibrate said internal circuit element based on said comparison.

4. The circuit of claim 1,
   wherein said internal circuit element is selected from a group comprising a tunable resistor and a tunable capacitor.

5. The circuit of claim 1, further comprising:
   a further internal circuit element,
   wherein said calibration circuit portion is configured to calibrate said further internal circuit element based on calibration results of said internal circuit element.

6. The circuit of claim 5, further comprising a current generation circuit portion,
   wherein said further internal circuit element is configured to determine a current output of said current generation circuit portion.

7. A chip, comprising:
   a plurality of external connection pins, and
   an integrated circuit on said chip, said integrated circuit comprising:
   a driver circuit coupled to at least one driver pin of said plurality of pins and
   a calibration circuit internal to said chip coupled to at least one of said at least one driver pin.

8. The chip of claim 7, wherein the calibration circuit comprises:
   a first current source,
   a second current source, and
   an internal circuit element,
   wherein the first current source is coupled with said internal circuit element and wherein said second current source is coupled to said at least one of said at least one driver pin.

9. The chip of claim 8, further comprising a first switch assigned to said first current source and a second switch assigned to said second current source to switch said first and second current source between a first mode of operation where the calibration circuit is inactive and a second mode of operation where said calibration circuit is active.

10. The chip of claim 8, wherein said calibration circuit further comprises a comparator,
wherein a first input of said comparator is coupled with a node between said first current source and said internal circuit element and a second input of said comparator is coupled with a node between said second current source and said at least one of said at least one driver pin.

11. The chip of claim 10, further comprising an evaluation circuit to evaluate an output of said comparator and to tune said internal circuit element based on said output of said comparator.

12. The chip of claim 11, wherein said evaluation circuit is configured to further tune a further internal circuit element based on a result of said tuning of said internal circuit element.

13. The chip of claim 12, wherein said internal circuit element and said further internal circuit element are designed to be equal.

14. The chip of claim 8, wherein said calibration circuit further comprises an analog to digital converter, wherein a first input of said analog to digital converter is coupled with a node between said first current source and said internal circuit element and a second input of said analog to digital converter is coupled with a node between said second current source and said at least one of said at least one driver pin.

15. The chip of claim 14, further comprising an evaluation circuit to evaluate an output of said analog to digital converter and to tune said internal circuit element based on said output of said analog to digital converter.

16. The chip of claim 8,
wherein said internal circuit element comprises a circuit element selected from a group comprising a polysilicon resistor, an array of polysilicon resistors, a capacitor and an array of capacitors.

17. An apparatus, comprising:
a chip, said chip comprising:
at least one pin,
a circuit portion coupled to said at least one pin,
a calibration circuit portion coupled to at least one of said at least one pin, and
an internal circuit element,
wherein said circuit portion is configured to communicate via said at least one pin in a first operating mode of said chip, and wherein said calibration circuit is configured to calibrate said internal circuit element in a second operating mode of said chip, and
an external circuitry coupled with said chip, said external circuitry comprising:
at least one external circuit element coupled to said at least one of said at least one pin, wherein said calibration circuit portion is configured to calibrate said internal circuit element using said external circuit element to tune the internal circuit element to a circuit element value corresponding to a circuit element value of said external circuit element.

18. The apparatus of claim 17,
wherein said circuit element value of said internal circuit element and said external circuit element is selected from a group comprising a resistance and a capacitance.

19. The apparatus of claim 17,
wherein said circuit portion comprises a driver circuit configured to output communication signals via said at least one pin,
wherein said external circuit portion further comprises a coupling circuit to couple said at least one pin with a communication line.

20. The apparatus of claim 19,
wherein said coupling circuit comprises a transformer, and
wherein said at least one external circuit element is coupled to a middle contact of said transformer on a side of said transformer coupled with said chip.

21. The apparatus of claim 19,
wherein said at least one pin comprises a first pin and a second pin,
wherein said coupling circuit comprises a transformer coupled to said first pin and coupled to said second pin, and
wherein said at least one external circuit element comprises a first external circuit element coupled to said first pin and a second external circuit element coupled to said second pin.

22. The apparatus of claim 17,
wherein said coupling circuit comprises at least one capacitor, and
wherein said at least one external circuit is coupled to a node between said at least one capacitor and said at least one of said at least one pin.

23. The apparatus of claim 17,
wherein said at least one pin comprises at least two pins, and
wherein said at least one external circuit element is connected in a symmetric manner with respect to said at least two pins.

24. A calibration method, comprising:
deactivating a circuit portion coupled to at least one pin of a chip, and
calibrating an internal circuit element of said chip using an external circuit element coupled with said at least one pin.

25. The method of claim 24,
wherein said circuit portion comprises a driver circuit portion, and
wherein deactivating said circuit portion comprises setting said driver circuit portion to a tristate mode.

* * * * *